UNITED STATES PATENT OFFICE.

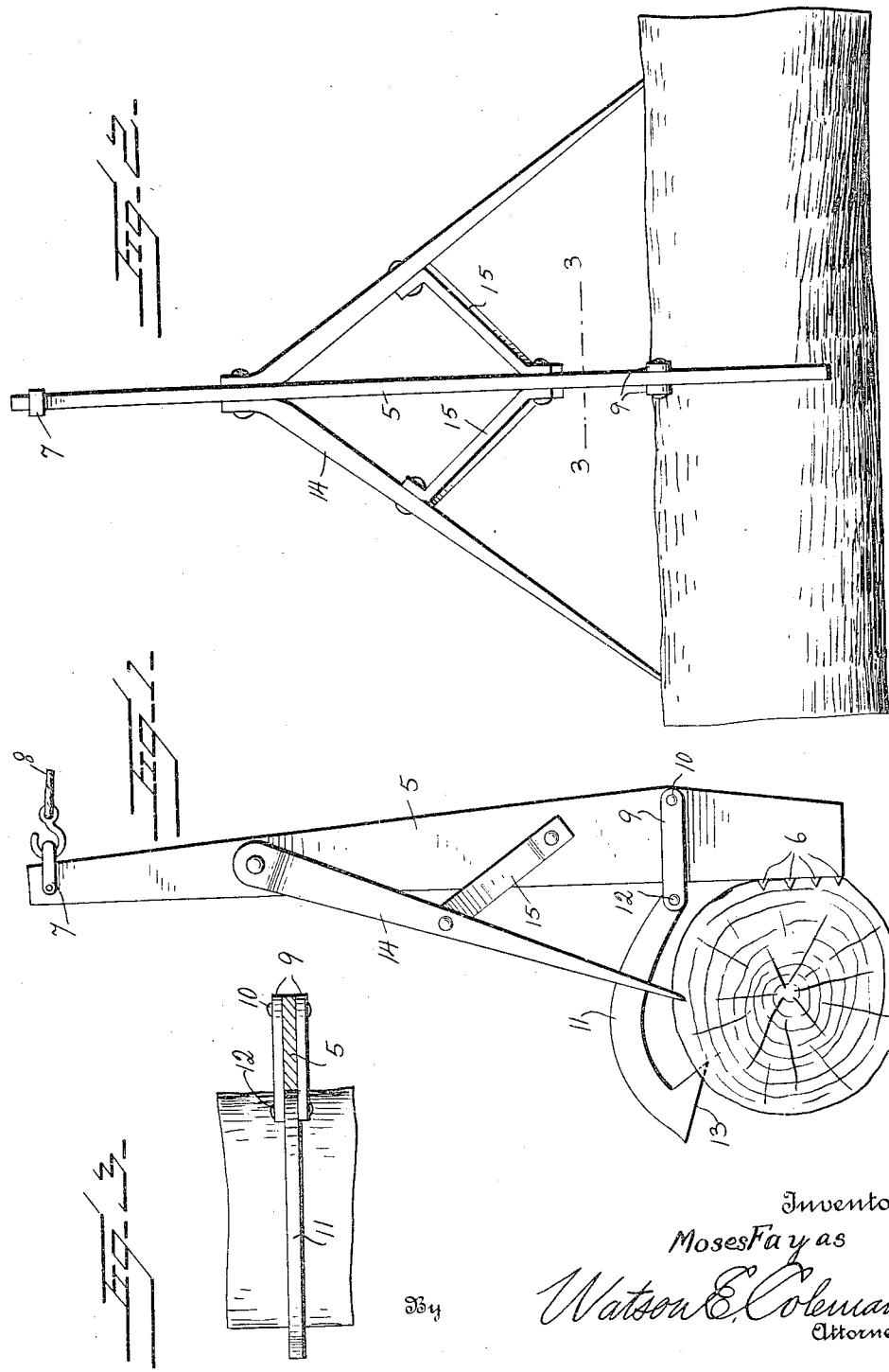

MOSES FAYAS, OF WILSON, MICHIGAN.

LOG-DRAG.

1,288,545.  Specification of Letters Patent.  Patented Dec. 24, 1918.

Application filed September 28, 1918. Serial No. 256,090.

*To all whom it may concern:*

Be it known that I, MOSES FAYAS, a citizen of the United States, residing at Wilson, in the county of Menominee and State of Michigan, have invented certain new and useful Improvements in Log-Drags, of which the following is a specification, reference being had to the accompanying drawings.

This invention relates to an improved log drag, and has for its primary object to provide simple and effective means for conveniently hauling or dragging logs, and one which may be very easily and quickly, as well as securely attached to the log.

It is also an important object of the invention to provide a device for the above purpose which is particularly advantageous in recovering submerged logs, and which is so constructed that the log will not be easily displaced and released from the device by contact with other logs.

And it is also a further general object of the invention to provide a log drag device which is very simple, as well as strong and durable in its construction, serviceable and efficient in practical use, and capable of manufacture at relatively small cost.

With the above and other objects in view, the invention consists in the improved construction, combination and relative arrangement of the several parts as will be hereinafter more fully described, subsequently claimed and illustrated in the accompanying drawing in which similar reference characters designate corresponding parts through out the several views, and wherein:—

Figure 1 is a side elevation illustrating one embodiment of the invention and showing the same applied to a log;

Fig. 2 is a view looking at right angles to Fig. 1; and

Fig. 3 is a section taken on the line 3—3 of Fig. 2.

Referring in detail to the drawing, 5 designates the body bar of my improved log drag which tapers longitudinally to one of its ends. This bar at its other end is provided on one longitudinal edge with a series of spaced teeth 6 for biting or gripping engagement on one side of a log. To the other end of said bar, a loop 7 is pivotally connected to which a pull or draw cable 8 is adapted to be attached. To opposite sides of the bar 5 and spaced longitudinally from the teeth 6, the links 9 are pivotally connected at one of their ends, as shown at 10. These links extend beyond the longitudinal edge of the bar on which the teeth 6 are formed and to the same one end of a dog 11 is pivotally connected, as shown at 12. The other end of this dog is longitudinally curved and terminates in an angularly disposed, inwardly projecting spur 13, which is adapted to deeply bite into the log, indicated at L at a point in spaced relation to the point of engagement of the teeth 6 with the log.

To the body bar 5, adjacent the end to which the loop 7 is connected, the impaling rods 14 are securely riveted at one of their ends and secured against the opposite side faces of said bar. These rods extend in divergent relation from the bar 6 and are also obliquely inclined in a lateral direction. The tapered or pointed ends of the rods 14 terminate short of the toothed end of the bar 5 and are laterally spaced from the teeth 6 on said bar so that they may be engaged in the log in spaced relation to its opposite ends and at points intermediate of the teeth 6 and the terminal spur 13 on the dog.

The impaling rods 14 are further rigidly braced by means of the rods or bars 15 which are riveted or bolted at one of their ends to the rods 14 intermediate the ends of the latter and have their ends securely bolted to opposite sides of the body bar 5.

In the use of the device, as above described, the teeth 6 on the end of the bar 5 are engaged against one side of the log, the points of the rods 14 being securely impaled in the log. The spur 13 of the dog 11 is engaged with the log at a point in line with the point of engagement of the teeth 6 and on the opposite side of the center of the log. Thus, the device will be securely held in its applied position upon the log, and by connecting the other end of the bar 5 by means of the cable 8 to a draft pole, the log may be dragged or pulled to the desired location. By the provision of the impaling rods 14, in conjunction with the dog 11 and teeth 6, the possibility of release of the log by striking other logs or obstructions is obviated. The device can, however, be easily detached by simply prying upwardly upon the dog 11 to disengage the spur 13 from the log and then releasing the impaling rods.

From the foregoing description, taken in connection with the accompanying drawing, the construction, manner of operation, and use of my invention will be clearly and fully understood. The several parts of the improved log drag are of simple and durable construction and together provide a very serviceable and efficient device which can be very easily and quickly applied to the log or detached therefrom. The device can also be readily engaged with submerged logs to securely grip the log so that it may be pulled or drawn to the surface of the water and recovered. I have above referred to a particular form and mounting for the gripping dog 11, but it will be understood that this feature of the device, as well as the several other details thereof, are susceptible of considerable modification. Accordingly, I reserve the privilege of adopting all such legitimate changes in the form, construction and arrangement of the various parts as may be fairly embodied within the spirit and scope of the invention as claimed.

I claim:—

1. A log drag comprising a body bar having teeth formed on one longitudinal edge at one end thereof, links pivotally connected to said end of the bar adjacent its opposite longitudinal edge and projecting beyond the toothed edge of said bar, a dog pivotally connected for swinging movement between the latter ends of the links, the free end of said dog being provided with an angularly disposed, inwardly projecting spur for gripping engagement with a log, and additional means fixed to opposite sides of the bar and adapted to be impaled in the log.

2. A log drag comprising a body bar having teeth formed on one longitudinal edge at one end thereof, links pivotally connected to said end of the bar adjacent its opposite longitudinal edge and projecting beyond the toothed edge of said bar, a dog pivotally connected for swinging movement between the latter ends of the links, the free end of said dog being provided with an angularly disposed, inwardly projecting spur for gripping engagement with a log, impaling rods fixed at one of their ends to opposite sides of said bar and extending in divergent relation therefrom toward the toothed end of the bar, the other ends of said rods being adapted to be impaled in the log in spaced relation to its opposite ends, and obliquely disposed brace bars fixed at one of their ends to said rods and at their other ends to the body bar.

In testimony whereof I hereunto affix my signature in the presence of two witnesses.

MOSES FAYAS.

Witnesses:
 JULE PIRLOT,
 ELI PIRLOT.

Copies of this patent may be obtained for five cents each, by addressing the "Commissioner of Patents, Washington, D. C."